United States Patent [19]

Kurafuji

[11] Patent Number: 4,686,594
[45] Date of Patent: Aug. 11, 1987

[54] CARTRIDGE TYPE FLOPPY DISK DRIVE

[75] Inventor: Hiroshi Kurafuji, Tokyo, Japan

[73] Assignee: Citizen Watch Co., Ltd., Tokyo, Japan

[21] Appl. No.: 627,882

[22] Filed: Jul. 5, 1984

[30] Foreign Application Priority Data

Jul. 4, 1983 [JP] Japan .............................. 58-103726
Aug. 23, 1983 [JP] Japan .............................. 58-153389
Sep. 6, 1983 [JP] Japan .............................. 58-163787
Sep. 6, 1983 [JP] Japan .............................. 58-138192

[51] Int. Cl.$^4$ .............................................. G11B 17/04
[52] U.S. Cl. ....................................................... 360/99
[58] Field of Search ................................... 360/97–99, 360/106, 105

[56] References Cited

U.S. PATENT DOCUMENTS

| | | | |
|---|---|---|---|
| 4,339,778 | 7/1982 | Wise | 360/99 |
| 4,445,157 | 4/1984 | Takahashi | 360/97 |
| 4,466,032 | 8/1984 | Saito | 360/97 |
| 4,523,240 | 6/1985 | Dunstan et al. | 360/99 |
| 4,546,397 | 10/1985 | Asami et al. | 360/99 |

Primary Examiner—Stuart N. Hecker
Attorney, Agent, or Firm—Koda and Androlia

[57] ABSTRACT

A floppy disk drive having a frame portion which includes a spindle motor for directly driving a floppy disk, a plurality of pins for positioning a disk cartridge relative to the spindle motor and a carriage carrying head for contacting the disk to READ/WRITE information there and for travelling to the desired track on the disk by the carriage, and a carrier pivotably mounted on the frame portion and adapted to contain the disk cartridge therein. The carrier for the disk drive further includes a cartridge guide pivotably and parallel-movably mounted therein and adapted to receive the disk cartridge, whereby the disk cartridge can be inserted into the cartridge guide when the cartridge guide is opened relative to the carrier at the pop-up position of the carrier, and the cartridge guide can be moved upwardly and parallel relative to the carrier to a predetermined position while holding the disk cartridge when the carrier is engaged by the frame portion.

1 Claim, 23 Drawing Figures

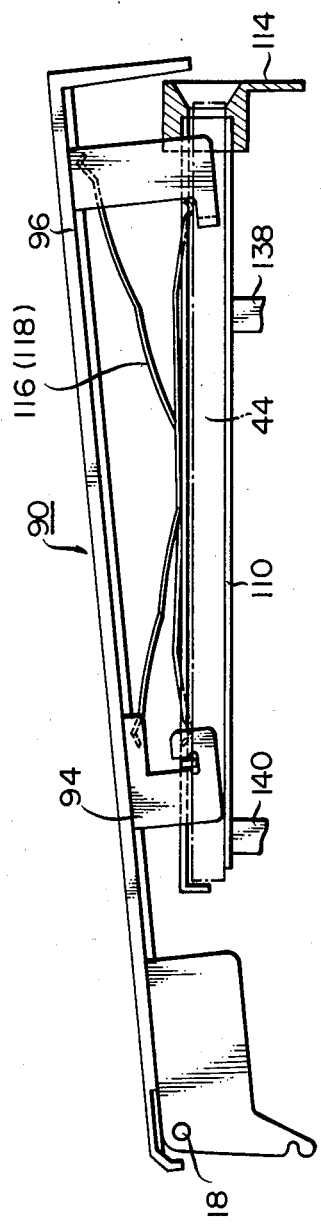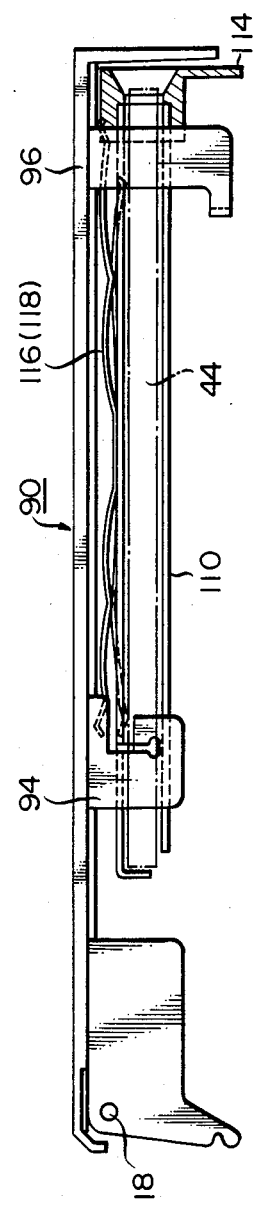

CARTRIDGE TYPE FLOPPY DISK DRIVE

BACKGROUND OF THE INVENTION

1. Field of the Invention

The present invention relates to a floppy disk drive, and particularly to an improved drive for a micro-floppy disk cartridge which contains a floppy disk as an information recording medium.

2. Prior Art

There are known various information recording media used as external memories for computers. Among them, magnetic disks are currently utilized since they are randomly accessible and easily handled. Recently, a so-called floppy disk has been developed which includes a substrate of flexible plastic sheet having one or two faces coated with magnetically storing layers. The floppy disk is increasingly used over the broad range of applications since it has many advantages, for example, in that the floppy disk is cheaper than hard disks and in that the floppy disk can easily be changed to another floppy disk to increase the capacity of memory.

More recently, a so-called cartridge type micro-floppy disk has been developed in which a floppy disk as an information recording medium is contained within a cartridge of hard plastic casing or the like. This is advantageous in that the floppy disk can extremely easily and simply be carried and handled while preventing the recording face(s) thereof from being damaged and contaminated by any foreign matters. Such a micro-floppy disk cartridge is broadly being utilized as an excellent external memory in small-size computers and particularly personal and domestic computers.

In the micro-floppy disk cartridge, the micro-floppy disk is housed within a hard plastic casing which has a shutter mechanism for preventing READ/WRITE faces of the disk from being exposed to protect the recording faces substantially completely from any foreign matters. Thus, a user can handle the floppy disk without his additional attention to the damage and contamination of the recording faces in the floppy disk. The micro-floppy disk cartridge also is mailable.

In order to most utilize the advantages of the micro-floppy disk cartridge, a floppy disk drive therefor must have various new performances different from those of the conventional 8-inch floppy disk drive. Main requirements to the micro-floppy disk drive is that it can be reduced in size and can be operated with the minimum power consumption.

Computers themselves are remarkably being reduced in size while increasing their processing speed and capacity. It is thus known that the entire size of a computer system depends on the dimension and arrangement of a keyboard, monitor and external memory. Consequently, the micro-floppy disk drive should necessarily be reduced in size and operated with the minimum power consumption such that a portable microcomputer can be realized.

The conventional micro-floppy disk drives comprises mechanisms similar to those of large-sized floppy disk drives. In most of the conventional micro-floppy disk drives, the disk is loaded into the forward loading port of the drive (front loading). In such a construction, the drive must have a passage for the cartridge. This provides a limitation when the size of the drive should be decreased, particularly to obtain a portable type floppy disk drive having a reduced thickness.

SUMMARY OF THE INVENTION

In view of the above problems in the prior art, it is therefore an object of the present invention to provide a small-sized floppy disk drive for driving micro-floppy disk cartridges.

To achieve the above object, the present invention provides a floppy disk drive comprising a frame portion including a spindle motor for directly driving a floppy disk, a plurality of pins for positioning the disk cartridge relative to said spindle motor, and a carriage for carrying heads which are adapted to contact said disk for reading/writing information, said carriage being adapted to move the heads to the desired track of said disk, and a carrier swingably supported by said frame portion and adapted to receive the disk cartridge, said carrier including cartridge guide means swingably and parallel-movably supported by said carrier and to which the disk cartridge is detachably mounted, whereby the cartridge can be inserted into said cartridge guide when it is separated from said carrier at the pop-up position thereof, and the cartridge guide can be moved parallel and upwardly relative to said carrier toward a predetermined position while holding said cartridge when said carrier is engaged by said frame portion.

BRIEF DESCRIPTION OF THE DRAWINGS

FIGS. 12, 13 and 14 illustrate how to contain the carrier according to the present invention;

DESCRIPTION OF THE PREFERRED EMBODIMENTS

Preferred embodiments of the present invention will now be described with reference to the drawings.

Figure 1:
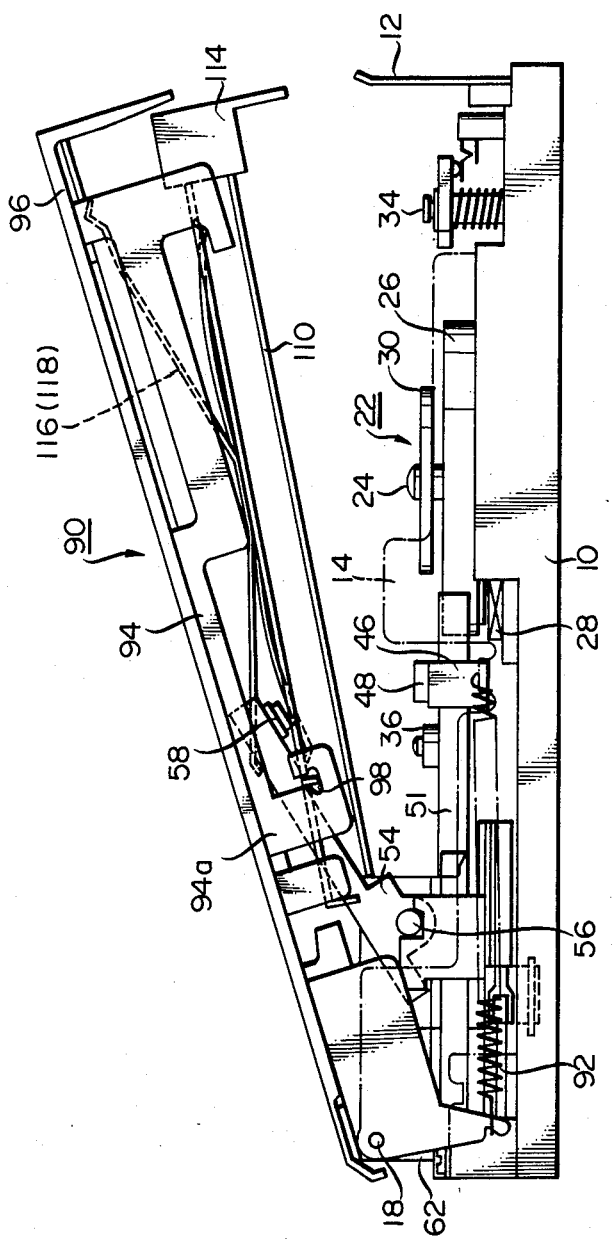
FIG. 1 is a side view of a preferred embodiment of the floppy disk drive according to the present invention, showing a carrier in its pop-up position.
Figure 3:
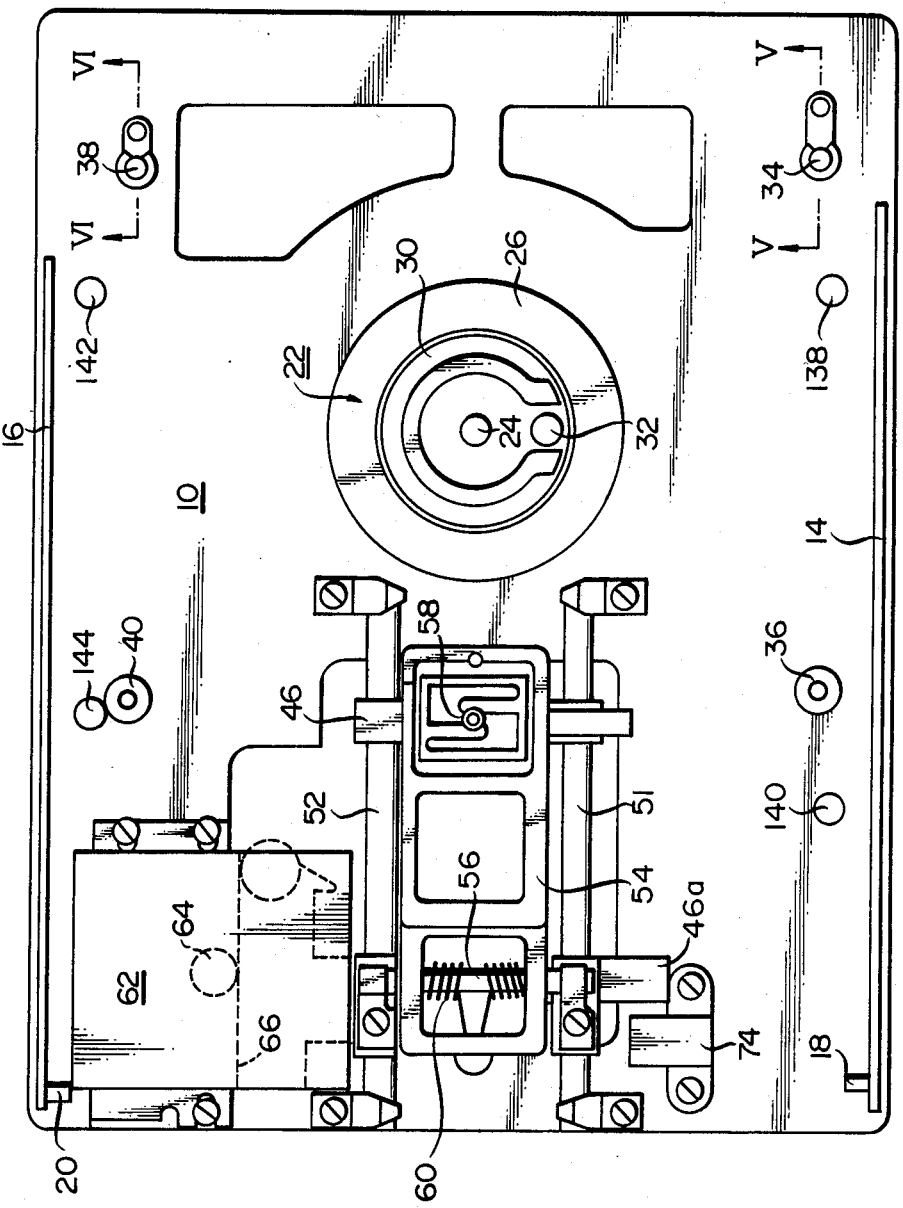
FIG. 3 is a plan view of the frame portion in the embodiment shown in FIG. 1.

Referring to FIGS. 1 and 3, there is shown a floppy disk drive according to the present invention which is a top loading type different from the conventional floppy disk drives.

The floppy disk drive according to the present invention comprises a frame portion which can be assembled into the body of a computer (not shown), and a carrier portion supported at one end by the frame portion for pivoting to a predetermined angle at which a cartridge can be loaded into the carrier. The computer body includes a CPU, a keyboard and a monitor and is connected integrally with the aforementioned floppy disk drive to form a computer system. The computer system is preferably portable such that it can be assembled into an attache case, for example.

Construction of the Frame

The frame portion includes a frame 10 of aluminium die casting or the like. The frame 10 includes a circuit board for driving the apparatus which is mounted on the bottom face thereof in a suitable manner. The circuit board cooperates with a host circuit in the computer to control READ/WRITE relative to the disk. The frame 10 also includes a forward plate 12 and side plates 14 and 16 all of which are fixed thereto. The side plates 14 and 16 fixedly support at their rearward ends carrier shafts 18 and 20, respectively. The carrier is pivotally supported by the carrier shafts 18 and 20 as described hereinafter.

The frame 10 further includes a spindle motor 22 assembled thereinto which comprises a motor shaft 24 supported by the frame 10, a rotor 26 fixedly mounted on the motor shaft 24, and a stator coil 28 fixedly mounted on the frame 10 adjacent to the lower portion of the rotor 26. The rotor 26 is in the form of a multi-pole type magnetic rotor which is adapted to rotate the disk in a given manner when the stator coil 28 is energized by an alternating electric power.

The motor shaft 24 has a drive hub 30 fixedly mounted thereon on which a floppy disk is positioned coaxially to the motor shaft 24 such that the floppy disk can directly be driven by a drive pin 32 on the drive hub 30 as described hereinafter.

The frame 10 further includes four positioning pins 34, 36, 38 and 40 fixedly located thereon the top faces of which serve to position the floppy disk relative to the spindle motor 22.

Figure 4:
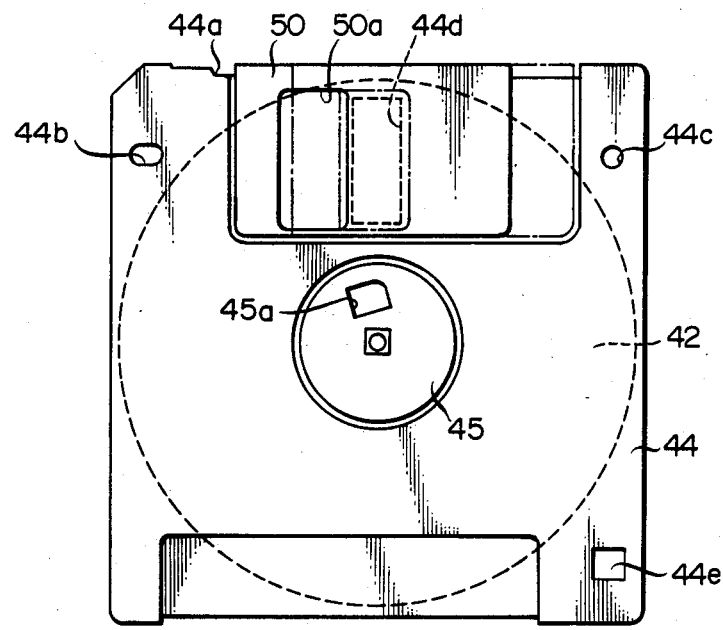
FIG. 4 is a plan view of a micro-floppy disk cartridge used in the present invention.
Figure 5:
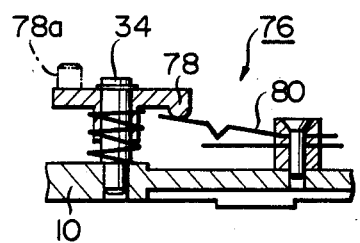
FIG. 5 is a sectional view taken along a line V—V in FIG. 3, showing a cartridge detecting switch mechanism.

FIG. 4 shows a cartridge type micro-floppy disk assembly which can be used in the present invention. This assembly includes a cartridge 44 of hard plastic material and a disk 42 rotatably contained within the cartridge 44 and on which information can be recorded. The disk 42 includes a driven hub 45 fixed thereto which will be positioned opposed to the drive hub of the spindle motor 22 so that the drive pin 32 can be inserted in to the read groove 45a of the disk 42 for driving the disk.

The cartridge 44 includes head receiving openings 44d formed at the opposite sides therethrough and extending radially in the disk. These openings 44d are used in reading/writing the disk 42. As well known, the head receiving openings 44d are normally closed by a shutter 50 which is slidably mounted within the cartridge 44. When the shutter 50 is moved to its operative position shown by broken line in FIG. 4, the opening 50a therein is aligned with the head receiving openings 44d to expose a portion of the disk 42.

The sliding movement of the shutter 50 is accomplished by operating a shutter lever disposed on the floppy disk drive described hereinafter. The cartridge 44 includes a groove 44a formed therein for conducting the tip of the shutter lever to a position in which the shutter lever engages the shutter 50. The cartridge 44 also includes positioning recesses 44b and 44c formed therein which are respectively engaged by the positioning pins 36 and 40. The surface of the cartridge 44 also is engaged by the positioning pins 34 and 38. Thus, the cartridge 44 can properly be positioned in place. As well known in the art, however, the micro-floppy disk 42 may finally be positioned by contacting the driven hub 45 with the drive hub 30 of the spindle motor 22 and also engaging the drive pin 32 with the read groove 45a without depending on the positioning of the cartridge 44 itself. Therefore, the cartridge 44 may temporarily be positioned in such a range of accuracy that the final position of the disk 42 can properly be determined.

To read/write the disk 42 as described above, the frame 10 slidably supports a carriage 46 such that it can be moved radially to the central axis of the spindle motor 22, that is, to the center of the disk 42. The carriage 46 has a read/write head 48 fixedly mounted thereon at the forward end.

The carriage 46 is slidably supported on the frame 10 by two carriage shafts 51 and 52 disposed parallel to each other.

The carriage 46 includes an arm 54 which is pivotally supported by an arm shaft 56. The tip of the arm 54 includes a pad 58 fixedly mounted thereon which cooperates with the head 48 to hold the disk 42 therebetween under a predetermined pressure which can be determined by the force of a spring 60 acting between the head 48 and the pad 58. In the illustrated embodiment, another head may be mounted on the tip of the arm 54 in place of the pad 58 to provide a double-headed drive system. In this disclosure, the term "head pair" which will be used hereinafter includes the set of head and pad and also a set of two heads.

In accordance with the present invention, the carriage 46 having the head 48 and pad 58 is reciprocated along the carriage shafts 51 and 52 by a stepper motor 62 which is fixedly mounted on the frame 10. Upon energization of the stepper motor 62, the carriage 46 and thus the head 48 is steppingly moved on the disk 42 to a desired location in the radial direction in the random access manner. The disk 42 can thus be read or written with respect to the desired track.

In the illustrated embodiment, the carriage 46 is connected with a pulley 64 fixedly mounted on the drive shaft of the stepper motor 62 by means of an belt 66 which will be described in detail. When the stepper motor 62 is energized, the carriage 46 is reciprocated.

To detect the head 48 in the track position "0 0" of the disk 42, the rearward end of the carriage 46 includes a light blocking portion 46a which can be detected by means of a photo-interrupter fixedly mounted on the frame at the path along which the light blocking portion 46a is moved. In this manner, the track "0 0" can electrically be detected.

To detect the cartridge 44 when it is properly positioned and held in place, the frame 10 further includes a cartridge detection switch 76 having a contact 80 which is normally engaged by an actuator 78. This actuator 78 is slidably mounted on the positioning pin 34 and upwardly urged by a spring. When the cartridge 44 is loaded to depress the projection 78a of the actuator 78 into a proper position, the contact 80 generates an ON operation signal which serves to supply a predetermined start signal to the control circuit.

Figure 6:
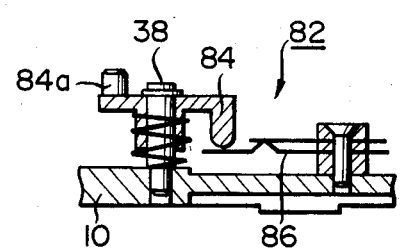
FIG. 6 is a sectional view taken a long a line VI—VI in FIG. 3, showing a write protector mechanism.

As shown in FIG. 6, the frame 10 further includes a write protector 82 which is adapted to inhibit the disk from writing if necessary. The write protector 82 includes an actuator 84 which is slidably supported on the positioning pin 38 and urged upwardly thereon. The write protector 82 also includes a contact 86 which is adapted to be depressed by the actuator 84 into its OFF position to inhibit the disk from writing. More particularly, the actuator 84 is provided with a projection 84a which is received by a hole formed on the cartridge 44 when a write protector section 44e thereon is removed as shown in Figure 4. At this time, the write protector contact 86 is in its ON condition so that even if the cartridge 44 is loaded into its proper position, a WRITE inhibiting signal can be supplied to the control circuit. On the other hand, if the write protector section 44e is not removed from the cartridge 44, the actuator 84 is moved downwardly to make the write protector contact 86 off to cancel the WRITE inhibition immediately when the cartridge is loaded.

Construction of the Carrier

The floppy disk drive according to the present invention is characterized by being a top loading type. For such a purpose, a carrier 90 is mounted on said frame 10 in such a manner that the carrier 90 is biased counterclockwise as viewed in FIG. 1 by means of a pop-up spring 92.

Figure 7:
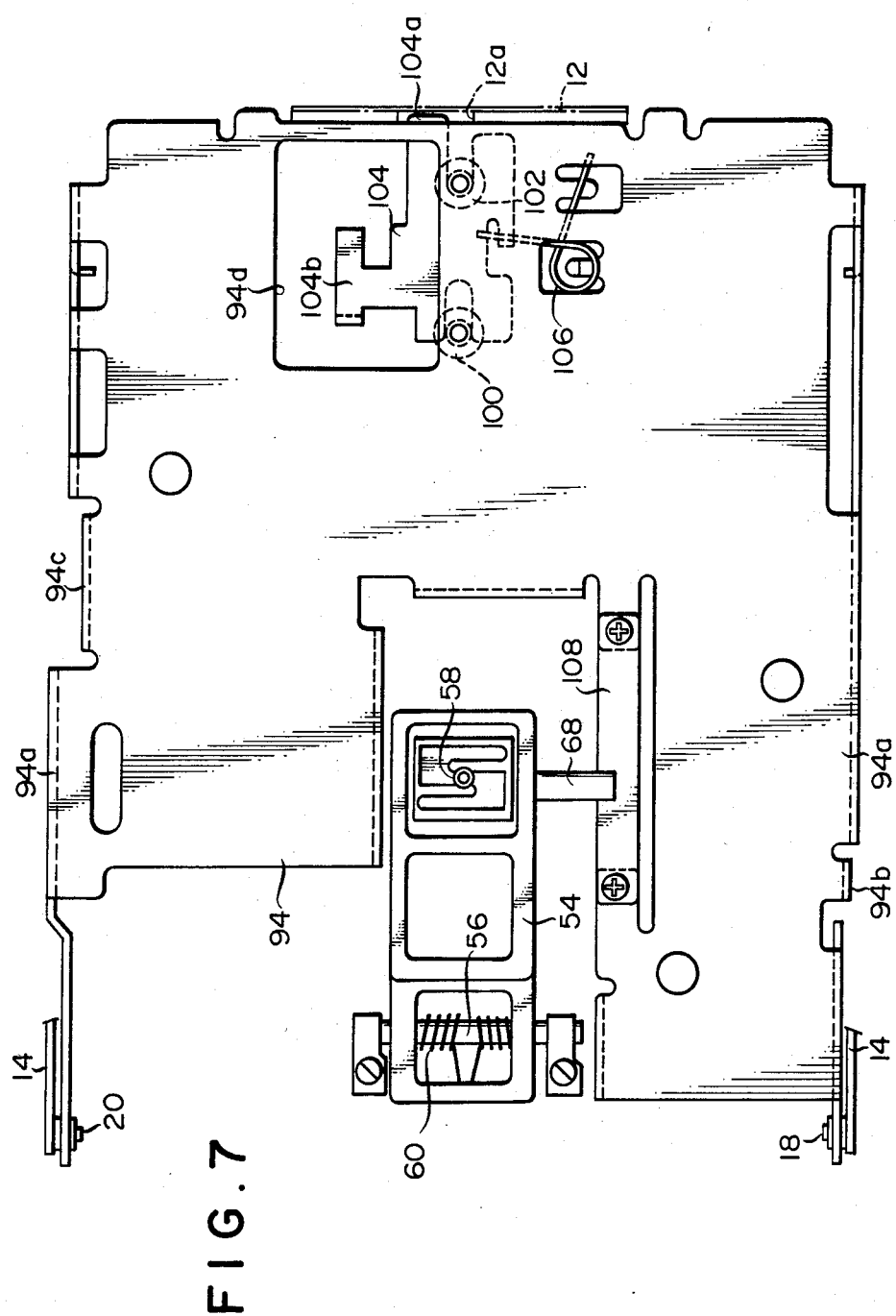
FIG. 7 is a plan view of the main body of a carrier according to the present invention.

The carrier 90 includes a carrier body 94 pivotably mounted on the frame 10 by the aforementioned carrier shafts 18 and 20 and a carrier cover 96 fixedly mounted on the carrier body 94. The details of the carrier body 94 are shown in FIG. 7. Although the carrier 90 is adapted to contain the disk cartridge therein, the present invention provides a cartridge guide as will be described hereinafter, which aids the carrier in containing the cartridge. In accordance with the present invention, the carrier 90 defines a supporting member for the cartridge guide. When the cartridge is inserted to and removed from the carrier 90, it is moved in a double action by the swinging movement of the carrier 90 and associated cartridge guide about different shafts relative to the spindle motor 22, the cartridge guide is moved parallel to itself within the carrier 90. Such a complicated movement enable the cartridge to be positively inserted to and removed from the carrier while effectively utilizing the limited space within the apparatus. This also results in small-sized construction.

The carrier body 94 includes a carrier locking mechanism for positioning and releasing the carrier 90 relative to the frame and an arm lifting mechanism for lifting the arm 54 of the aforementioned carriage 46.

To provide the support of the cartridge guide which is the primary purpose of the carrier body 94, it is provided with bent portions 94a at the opposite sides. Each of the bent portions 94a includes a bearing groove 98 formed therein which has an internal opening. The cartridge guide, which will be described hereinafter, can be pivoted and moved parallel to itself in the presence of these bearing grooves 98. The carrier body 94 also includes further bent portions 94b and 94c formed therein at the opposite sides, by which the transverse movement of the cartridge guide can be constrained.

The carrier locking mechanism includes a lock lever 104 which is mounted on the carrier body 94 by pins 100 and 102 in such a manner that the lock lever can be slided transversely as viewed in FIG. 7. The lock lever 104 is biased rightwardly as viewed in FIG. 7 by means of a spring 106 with the lock end 104a thereof extending rightwardly beyond the carrier body 94.

When the lock lever 104 is engaged by the lock opening 12a in the forward plate 12, the lock lever 104 can position and hold the carrier 90 positively relative to the frame 10.

The opposite end 104b of the lock lever 104 extends outside beyond the opening 94b in the carrier body 94. Thus, if the opposite end 104b of the lock lever 104 supports any suitable lock-cancelling button or the like such that the lock lever 104 can be moved leftwardly against the action of the spring 106, the lock lever 104 can be disengaged by the forward plate 12 so that the carrier 90 can be popped up from the frame 10.

The carrier body 94 also includes an arm lift lever 108 fixedly mounted thereon which is adapted to engage the arm lift 68 in the arm 54 when the carrier 90 is popped up. Thus, the arm lift lever 108 can lift the arm lift 68 to separate the arm 54 from the carriage against the action of the urging spring 60 such that the pad (or the upper head) will be protected from damage.

As seen from FIG. 1, the carrier body 94 includes a carrier cover 96 of plastic or the like which is fixedly mounted on the carrier body 94 to form the top wall and part of the front wall of the floppy disk drive itself.

Figure 2:
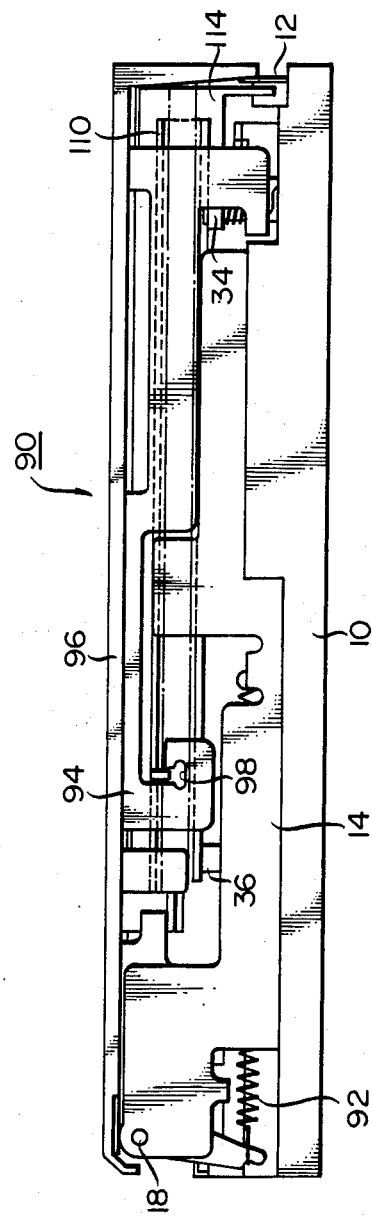
FIG. 2 is a side view, partially broken, of the drive when a disk is contained in the frame portion and operated by the carrier shown in FIG. 1.

As can be understood from the foregoing, the carrier 90 can be pivoted from the frame 10 both to its pop-up position shown in FIG. 1 and to its loading position shown in FIG. 2. Thus, the cartridge can be positioned at a predetermined position within the carrier 90 and removed therefrom. In accordance with the principle of the present invention, the disk cartridge 44 is not directly loaded into the carrier 90, but inserted into the cartridge guide which is supported by the carrier 90 in such a manner that the cartridge guide can be pivoted and moved parallel to itself. The details of the cartridge guide 110 are shown in FIG. 8.

The cartridge guide 110 is provided with outwardly extending projections 112 at the opposite sides. Each of the projections 112 is adapted to engage the corresponding shaft receiving groove 98 in the carrier body 94 such that the cartridge guide 110 can be pivoted and moved parallel relative to the carrier 90.

Figure 8:
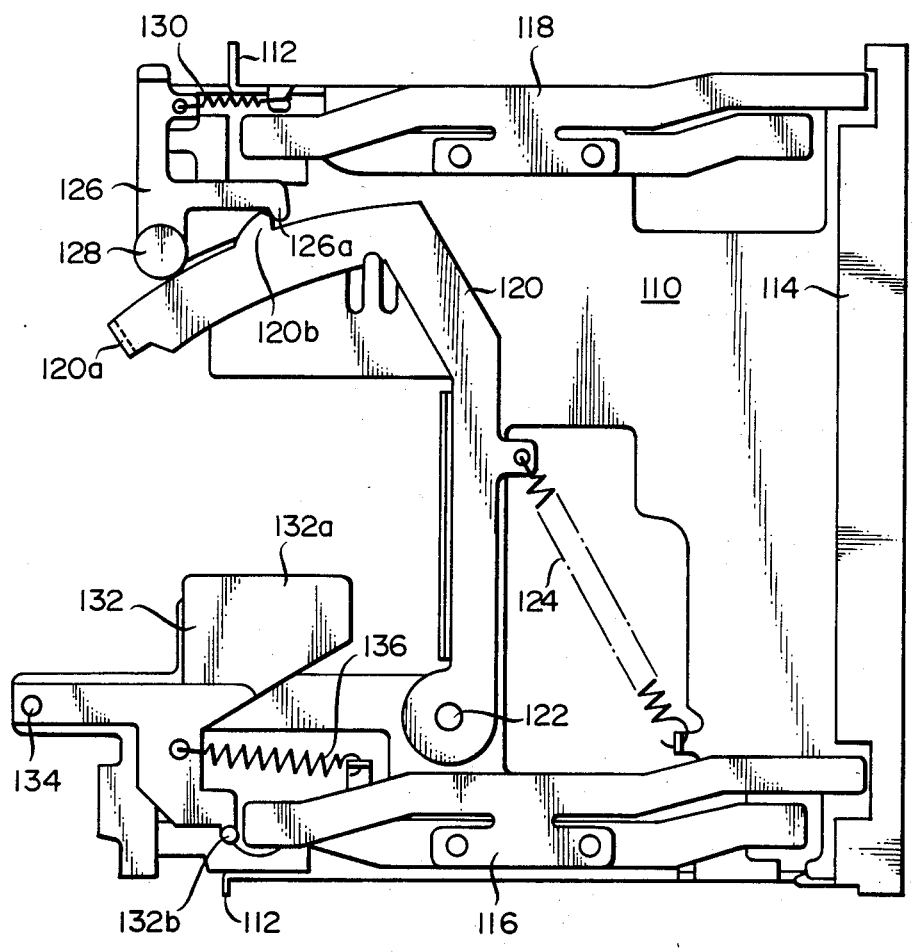
FIG. 8 is a plan view of a cartridge guide according to the present invention.

A cartridge insertion lid 114 of plastics or the like is fixedly mounted on the cartridge guide 110 at the rightward side as viewed in FIG. 8. As seen from FIG. 9, the insertion lid 114 is exposed when the carrier 90 is in its pop-up position. As a result, the cartridge 44 can easily be inserted into the cartridge guide 110. The cartridge guide 110 also includes cartridge holding springs 116 and 118 fixedly mounted thereon at the opposite sides. Each of the springs 116 and 118 includes an upwardly curved end contacting the carrier body 94 and a downwardly curved end contacting the cartridge 44.

In the pop-up position of the carrier 90 as shown in FIG. 1, the cartridge guide 110 is pivoted about the projections 112 downwardly from the carrier 90 to a predetermined position at which the cartridge guide 110 is held. When the cartridge is inserted into the cartridge guide 110 at such a position as shown in FIG. 1, the cartridge will be urged downwardly within the cartridge guide 110 under the action of the springs 116 and 118.

When the carrier 90 is locked relative to the frame 10 as shown in FIG. 2, the cartridge contained within the cartridge guide 110 is pressed against the positioning pins 34, 36, 38 and 40 under the influence of the cartridge holding springs 116 and 117. This establishes the loading position of the carrier 90.

The cartridge guide 110 further includes a push-out 120 pivotally mounted thereon through a shaft 122. The push-out 112 is biased clockwise as viewed in FIG. 10 under the action of a spring 124. The push-out 120 serves to discharge the cartridge out of the cartridge guide 110 and also to open the shutter 50 in the cartridge 44 shown in FIG. 4. The push-out 120 includes a downwardly curved tip 120a which is adapted to enter the groove 44a of the cartridge 44 to expel the shutter 50 so that the head introducing opening 44d will be opened.

FIG. 8 shows the push-out 120 when it is moved to its most-counter-clockwise position by insertion of the cartridge 44. In such a position, the hook portion 120b of the push-out 120 is engaged by the trigger end 126a of a push-out trigger 126 such that the shutter can be held open.

The push-out trigger 126 is pivotally mounted on the cartridge guide 110 through a shaft 128 and also biased clock-wise as viewed in FIG. 8 under the action of a spring 130.

The cartridge guide 110 further includes a head guard 132 pivotably mounted thereon through a shaft 134. The head guard 132 is biased counter-clockwise as viewed in FIG. 8 under the action of a spring 136. The guard end 132a of the head guard 132 is then inserted between the head 48 and the pad 58 so that the head 48 can be prevented from being damaged when the cartridge 44 is not loaded in the carrier 90. The head guard 132 includes a pin 132b which is expelled by the cartridge 44 to retract the head guard 132 out of the path of the cartridge 44 when loaded.

Operation of Push-out and Head Guard

Figure 10:
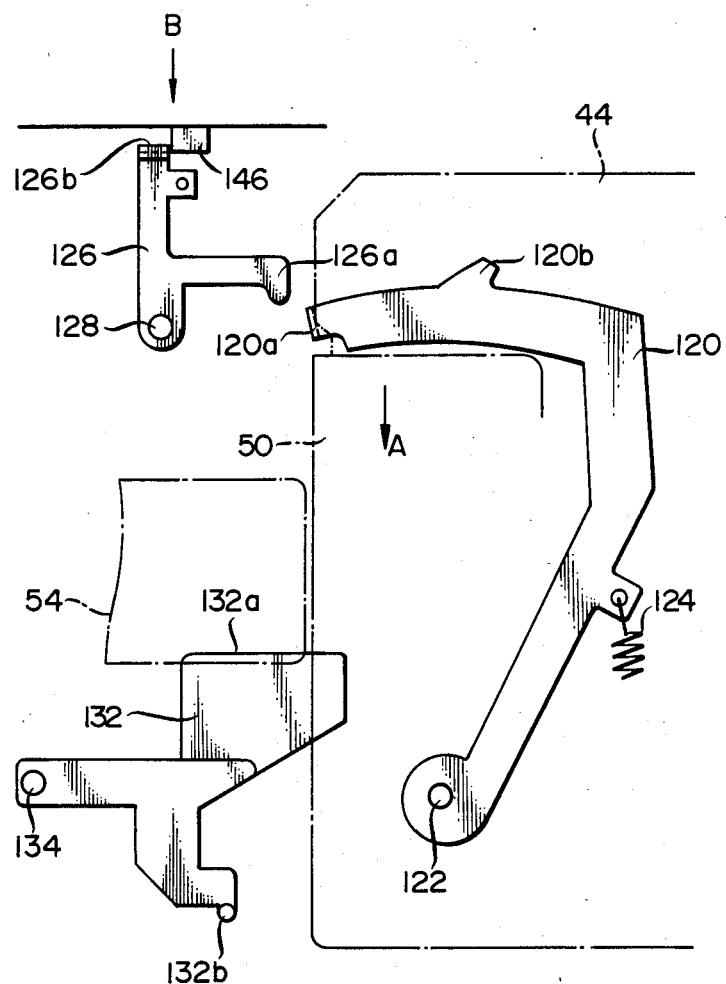
FIGS. 10 and 11 illustrate push-out and head guard in accordance with the present invention.
Figure 11:
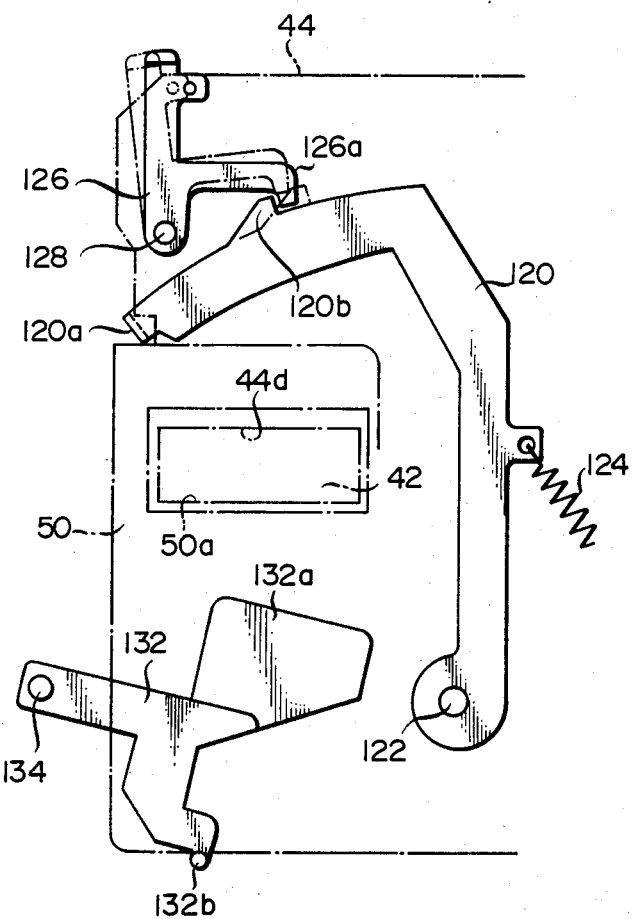

FIGS. 10 and 11 show the cartridge 44 when it is loaded in the cartridge guide 110 and mainly illustrates the operation of the push-out 120 and head guard 132.

Figure 9:
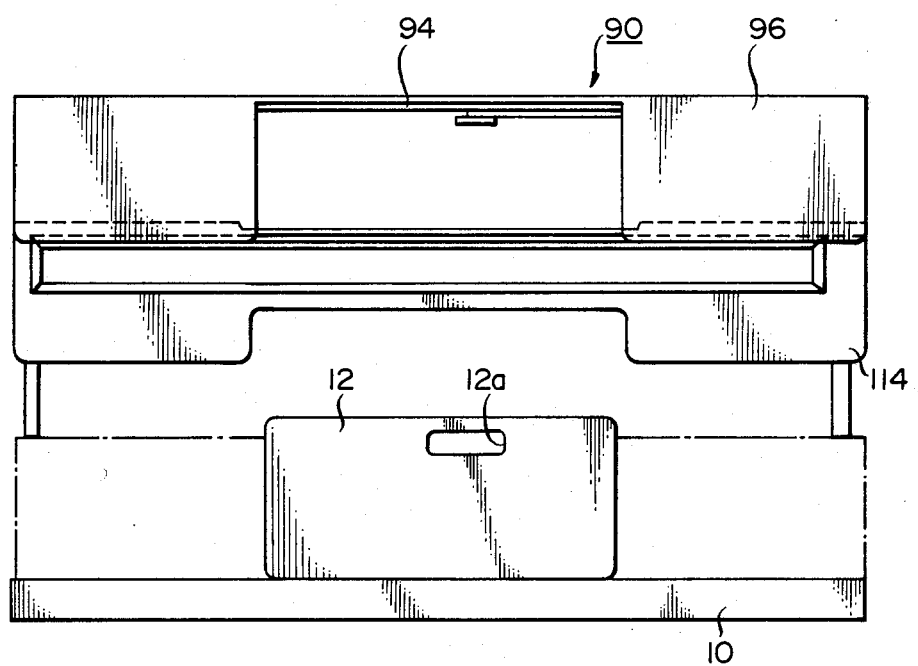
FIG. 9 is a front view of the apparatus at its pop-up position as viewed from the cartridge insertion side.

In the pop-up position of the carrier 90 as shown in FIGS. 1 and 9, the cartridge 44 may be inserted into the cartridge guide 110 through the cartridge insertion opening 114. FIG. 10 shows the cartridge 44 in its halfway position when it is inserted into the cartridge guide 10. In such a position, the forward end of the cartridge 44 is engaged by the curved portion 120a of the push-out 120. At the same time, the guard end 132a of the head guard 132 is moved under the arm 54. As a result, the head 48 can be protected from damage and contamination even if the carrier 90 is received by the frame 10 when the cartridge 44 is not loaded in the carrier 90. In the pop-up position shown in FIG. 10, however, the head guard 132 will not directly contact the arm 54 since the arm lift 68 is lifted by the arm lift lever 108 as seen from FIG. 7.

When the cartridge 44 is further moved leftwardly from the position shown in FIG. 10, the push-out 120 is pivoted counter-clockwise about the shaft 122 and at the same time the curved portion 120a causes the shutter 50 to move in the direction of arrow A such that the opening 50a will be opened to the head introducing opening 44d as shown in FIG. 11. When the cartridge 44 is further moved leftwardly, the leftward end thereof contacts the pin 132b on the head guard 132. As a result, as shown in FIG. 11, the head guard 132 is retracted clockwise.

FIG. 11 shows the cartridge 44 when it is moved to and held at a predetermined position in which the curved portion 120a of the push-out 120 causes the shutter 50 to open completely. In such a condition, the head introducing opening 44d is aligned with the opening 50a to expose the disk 42 so that READ/WRITE can be effected by the head 48.

Since the head guard 132 is retracted clockwise as shown in FIG. 11, the contact of the head 48 with the disk 42 will not be disturbed. This condition is maintained by engaging the hook portion 120b of the push-out 120 with the cartridge beyond the trigger end 126a of the push-out trigger 126 against the influence of the spring 134.

When the carrier 90 is moved to the frame 10 under such a condition as shown in FIG. 11, the cartridge 44 can be held at its predetermined position in which the disk 42 can easily be read/written by the head 48.

When it is desired to removed the cartridge 44 from the cartridge guide 110, the push-out 120 may be separated from the push-out trigger 126 during popping-up of the carrier 90 to discharge the cartridge 44 from the cartridge guide 110 under the action of the spring 124. For this purpose, at a suitable time during the popping-up, the push-out trigger 126 is pivoted as shown by broken line in FIG. 11 to disengage the trigger end 126a thereof from the hook portion 120b such that the cartridge 44 will be discharged by the push-out 120. This release of the push-out trigger 126 is operatively associated with the pop-up operation which will be described hereinafter.

Loading and Unloading of Cartridge

It is understood from the aforementioned structure according to the present invention that the cartridge 44 can be positioned in its proper position by springingly pivoting the carrier relative to the frame portion, introducing the cartridge 44 into the cartridge guide swingably mounted on the carrier, and thereafter inserting the carrier into the frame portion. This is the so-called top loading system which enables the apparatus to be reduced in size and particularly in thickness.

Figure 12:
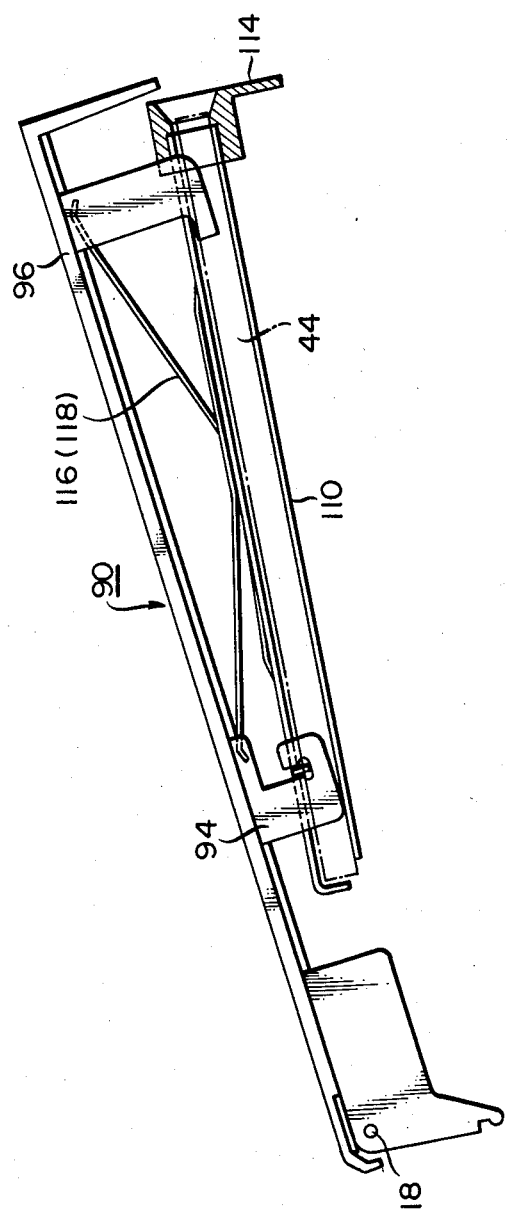

FIGS. 12, 13 and 14 illustrate the loading and unloading of the cartridge 44.

In FIG. 12, the carrier 90 is springingly pivoted to its most opened position about the shaft 18, in which the cartridge guide 110 is held at its clockwise rotated position relative to the carrier 90 under the influence of the springs 116 and 118. As seen from FIG. 12, since the bearing portions (bearing grooves 98) of the cartridge guide 110 is in its open side from the shaft 18 of the carrier 90 itself, the cartridge guide 110 can springingly be pivoted in a double action when it is popped up. In the pop-up position of FIG. 12, the cartridge guide 110 is positioned at an angle smaller than that of the carrier 90. Thus, the present invention provides a thin construction which can positively avoid any engagement of the head with the cartridge by independently operating the carrier 90 and cartridge guide 110.

Particularly, the angle of the cartridge guide 110 relative to horizontal in FIG. 12 can be set at such a proper value that the forward end of the cartridge 44 will not engage the head and pad (upper head) when the cartridge 44 is loaded into the cartridge guide 110. This enables the apparatus to be reduced in size.

Since the drive according to the present invention has a top loading mechanism as aforementioned, the carrier and cartridge guide receiving the cartridge 44 are exposed outside when the drive according to the present invention is incorporated into, for example, a small-sized computer and particularly an attache case type computer. Therefore, the cartridge can loaded or unloaded in the carrier with great ease.

In FIG. 12, the cartridge 44 is easily inserted into the cartridge guide and downwardly urged by means of the cartridge holding springs 116 and 118.

In such a condition that the cartridge is to be inserted into the cartridge guide, the forward face of the drive apparatus has the loading opening 114 exposed outside as shown in FIG. 9. Thus, the cartridge 44 can be inserted into the cartridge guide through the loading opening very easily. As seem from FIG. 7, the arm 54 has already been lifted by the arm lift lever 108. When the cartridge 44 is inserted into the cartridge guide, therefore, the cartridge 44 will not contact the pad 58 (or upper head).

When the cartridge 44 is completely loaded in the cartridge guide 110, the carrier 90 is manually pivoted clock-wise such that the carrier 90 is moved into the frame 10 as shown in FIGS. 13 and 14. FIG. 13 shows the cartridge guide 110 when it begins to engage guide positioning pins 138, 140, 142 and 144 to pivot and move in parallel. In other words, the cartridge guide 110 initiates to move relative to the carrier 90 against the influence of the cartridge holding springs 116 and 118 at the position shown in FIG. 13. The cartridge guide 110 is then moved upwardly and parallel within the carrier 90 to the position shown in FIG. 14 at which the cartridge guide 110 is held.

FIG. 14 shows the carrier 90 when it is completely contained in the frame portion. The cartridge guide 110 is moved into the upper half of the carrier 90 while receiving the cartridge 44. In such a position, the disk can be driven by the spindle motor 22.

As seen from the drawings, the carrier 90 has a thickness sufficiently larger than that of the cartridge guide 110. As a result, a sufficiently large opening for receiving the cartridge 44 is provided at the pop-up position of the carrier 90. On the other hand, the cartridge guide 110 is moved into the upper half of the carrier 90 when the carrier 90 is moved into the frame portion. Therefore, the space can more effectively be utilized to reduce the apparatus in size.

Figure 15A:
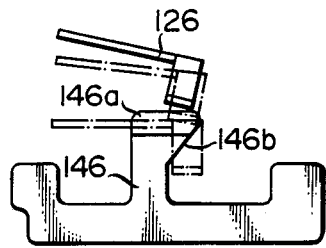
FIGS. 15A and 15B illustrate the push-out when triggered and set as viewed from an arrow B in FIG. 10.
Figure 15B:
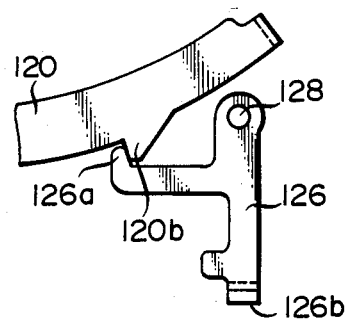
Figure 16:
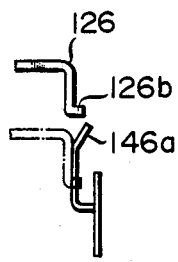
FIG. 16 is a side view of FIG. 15A.

When the cartridge is in its position that is inserted into the cartridge guide as shown in FIGS. 12, 13 and 14, the push-out 120 shown in FIGS. 10 and 11 is set at its triggering position as shown in FIGS. 15, 16 and 17.

FIG. 15A is a front view of the push-out trigger 126 of FIG. 10 as viewed in the direction of arrow B. As seen from this figure, the frame portion includes a trigger set spring 146 of spring sheet fixedly mounted thereon. As seen from FIG. 16, the trigger set spring 146 has a spring portion bent toward the push-out trigger 126 with the tip thereof forming a sloped relief portion 146a. As seen from FIG. 15A, the trigger set spring 146 also includes a sloped slide surface formed therein at the rightward end. When the trigger set spring 146 engages the trigger set end 126b of the push-out trigger 126, the desired trigger setting can be effected.

More particularly, as can be understood from the description relating to FIGS. 10 and 11, the push-out 120 is held at the position shown in FIG. 11 by the push-out trigger 126 when the cartridge 44 is inserted into the cartridge guide 110. Thereafter, the carrier 90 can be moved into the interior of the frame portion. At this time, as shown in FIGS. 15A and 16, the push-out trigger 126 is moved downwardly toward the trigger set spring 146. The trigger set end 126b then contacts the relief portion 146a to move downwardly while urging the trigger set spring 146 rightwardly as shown by broken line in FIG. 16. Finally, the trigger set end 126b enters under the slide surface 140b of the trigger set spring 146. As shown in FIG. 15B, therefore, the push-out trigger 126 will not rotate relative to the shaft 128 due to the rightward movement of the trigger set spring 146. As a result, the push-out trigger 126 can move under the trigger set spring 146 to complete the trigger setting without disengagement of the push-out 120.

When the carrier 90 is completely received by the frame portion through the above series of operations, the lock lever 104 shown in FIG. 7 is engaged by the forward plate 12 to effect a predetermined locking action such that the apparatus can perform the desired READ/WRITE.

Upon completion of the desired reading or writing operation, the lock lever 104 is manually operated to pop the carrier 90 upwardly again so that the cartridge 44 will be discharged from the cartridge guide 110 in the process opposite to that shown in FIGS. 12, 13, and 14.

FIG. 17 shows the cartridge guide 110 from which the cartridge 44 is discharged by the push-out 120 when the cartridge guide 110 is moved and opened from the frame portion through a predetermined angle which can be set to smoothly discharge the cartridge 44 through the sufficiently opened cartridge guide 110 without contacting any other components.

Figure 17A:
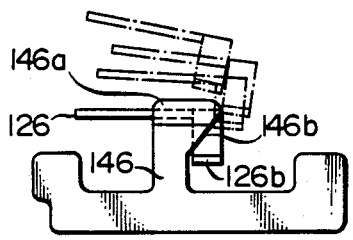
FIGS. 17A and 17B illustrate the triggering of the push-out.
Figure 17B:
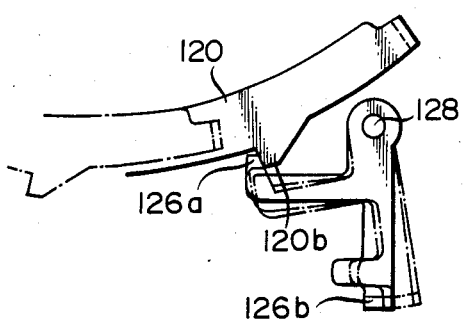

More particularly, as seen from FIG. 17A, when the carrier 90 is popped up, the push-out trigger 126 is upwardly moved with the cartridge guide 110 since the trigger set end 126v of the push-out trigger 126 has entered under the slide surface 146b of the trigger set spring 146. At this time, the trigger set end 126b contacts the slide surface 146b to move rightwardly as viewed in FIG. 17A (counter-clockwise relative to the shaft 128 in FIG. 17B). During this movement, the trigger end 126a disengages from the hook portion 120b of the push-out 120 such that the push-out 120 will act to discharge the cartridge 44 from the cartridge guide 100 under the influence of the spring 124.

In such an arrangement relating to the push-out trigger 126 and trigger set spring 146, the popping-up of the carrier 90 can properly be timed with the discharging of the cartridge 44 from the cartridge guide 110 by suitably selecting the angle through which the cartridge 44 is discharged.

Carriage Travelling Mechanism

To travel the carrier 46 until the head thereon reaches the desired track on the disk, the illustrated embodiment utilizes the stepper motor 62 as described hereinbefore. A mechanism for converting the rotational drive the of the stepper motor 62 into the reciprocation of the carriage 46 will no be described with reference to FIGS. 18 and 21.

In accordance with the present invention, the travel of the carriage can be achieved by utilizing an belt which is spanned along the carriage with part of the belt being fixed to a pulley. This provides a positive travel of the carriage in a limited space.

Figure 18:
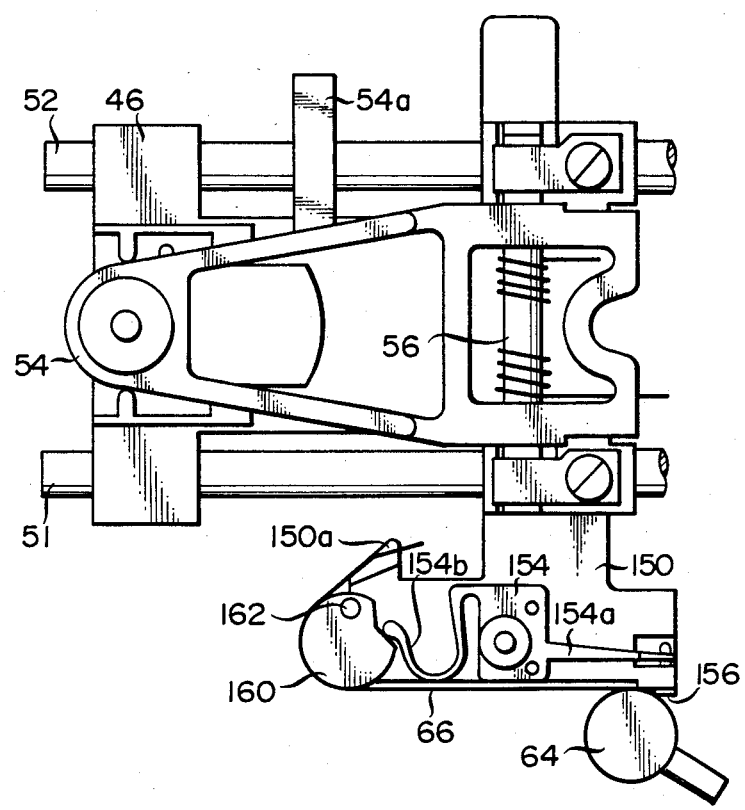
FIG. 18 is a schematic plan view of a carriage feed mechanism according to the present invention.

In FIG. 18, the carriage 46 includes a belt receiving portion 150 formed therein, the opposite ends of which are connected respectively with the corresponding ends of the belt 66.

Figure 19:
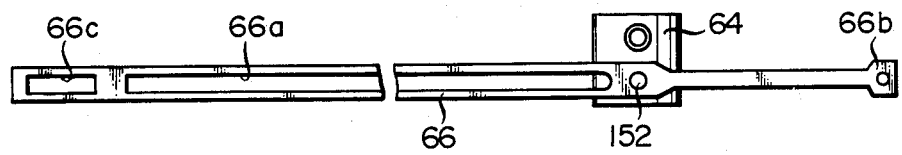
FIG. 19 is a front view of the belt used to feed the carriage.
Figure 20:
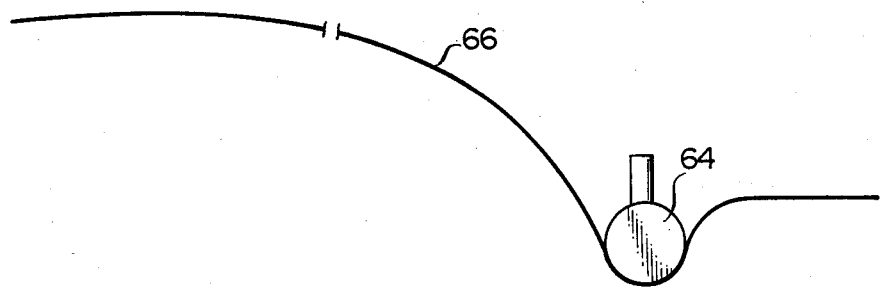
FIG. 20 is a plan view of the belt.

The belt 66 is connected with a pulley 64 by means of a fastening pin 152 at a position intermediate between the opposite ends of the belt as shown in FIGS. 19 and 20. The belt 66 is reduced in width from the above position in one direction. The belt 66 has a widened portion extending from the intermediate portion thereof in the opposite direction. This widened portion of the belt 66 includes a groove 66a formed therein and extending centrally along the length of the belt. The belt 66 is wound around the pulley 64 by freely passing the reduced portion through the groove 66a in the widened portion. When the pulley 64 is rotated in one direction, the belt 66 in unwound from the pulley 64. When the pulley 64 is rotated in the opposite direction, the belt 66 is wound about the pulley 64. The belt 66 can be connected to the pulley 64 by any other means such as spot-welding.

Figure 21:
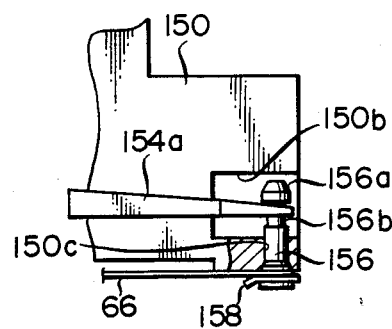
FIG. 21 is a plan view, in an enlarged scale, of the primary portion of a mechanism for supporting one end of the belt shown in FIG. 18.

The belt 66 is fixed at one end 66b to the righthand end of the belt receiving portion 150 by an anchoring mechanism shown in FIG. 21. The other end of the belt 66 is hooked by an anchor pawl 150a formed on the belt receiving portion 150 at the other end that the belt 66 can be connected with the carriage 46.

FIG. 21 shows a structure in which the end 66b of the belt 66 can easily and simply be connected with the belt receiving portion 150. In such a structure, a belt supporting spring 156 is fixed to the belt receiving portion 150. The belt supporting spring 154 includes an anchor spring portion 154a formed therein at one end. The tip of the anchor spring portion 154a is engaged by a lock pin 156 fixed to the belt 66 at one end. The lock pin 156 is fixedly attached to the one end of the belt 66 through a washer 158 by any suitable manner such as caulking or the like. The lock pin 156 includes a tapered tip portion 156a and a neck portion 156b joined to the tapered tip 156a. On the other hand, the belt receiving portion 150 includes a cavity 150b and an aperture 150c extending to the cavity 150b through the wall of the belt receiving portion 150. The lock pin 156 extends through said aperture 150c.

As seen from FIG. 21, the tip portion of the lock pin 156 extending through the aperture 150c protrudes into the cavity 150b. The neck portion 150b is engaged by the tip of the anchoring spring portion 154a to bias the lock pin 156 upwardly as viewed in FIG. 21. As a result, the one end of the belt 66 may be removed from the belt receiving portion 150 simply by lifting the anchoring spring portion 145a without any additional tool.

The other end of the belt 66 may be anchored simply by hooking and unhooking groove 66c thereof to the anchor pawl 150a. Under such a condition, however, the belt 66 will loosely be connected with the carriage 46. As a result, the reciprocation of the pulley 64 cannot be effected with the desired accuracy.

In the illustrated embodiment, the belt 66 can properly be spanned over the carriage 46 by applying a biasing force to the belt 66 after it has been connected with the belt receiving portion 150. For this purpose, a biasing cam 160 is swingably supported on the belt receiving portion 150 by means of a shaft 162. The biasing cam 160 receives a biasing force from a biasing spring 154b which is located on the belt supporting spring 154 at the opposite end. Thus, the biasing cam 160 always applies a force to the belt 66 such that it will be opened outwardly. Therefore, the belt 66 can always be tensioned to a predetermined level after assembled.

In such an arrangement, the belt 66 or carriage 46 may effectively be accomodated with respect to any possible error due to changed temperatures, passage of time or the like.

Thus, the present invention provides a small sized and particularly thin floppy-disk drive and then contributes to miniaturization and portability in computer systems to a great extent.

I claim:

1. A floppy disk drive comprising a frame portion including a spindle motor for directly driving a floppy disk, a plurality of pins for positioning a disk cartridge relative to said spindle motor and at least one head means for contacting said disk to READ/WRITE information thereon, a carriage for supporting and moving said head means to a desired track on said disk, and a carrier pivotally mounted on said frame portion and for containing said disk cartridge therein, said carrier including a cartridge guide loosely pivotally mounted on and parallely movable relative to said carrier, said cartridge guide for receiving said disk cartridge, a first spring means for biasing said cartridge guide in a direction perpendicular to said carrier when said carrier is in a pop-up position and a second spring means for biasing said carrier towards said popped-up position, whereby said disk cartridge can be inserted into said cartridge guide when said cartridge guide is opened relative to said carrier at said pop-up position of said carrier, and said cartridge guide can be moved pivotally relative to said carrier and moved to a predetermined position parallel to said carrier while holding said disk cartridge when said carrier is engaged by said frame portion, said floppy disk drive further characterized by means for causing said carrier to pop-up at a predetermined first angle and for causing said cartridge guide to pop-up at a predetermined second angle which is smaller than said first angle relative to said frame whereby the cartridge is ejected after said carrier pops-up at said first angle.

* * * * *